United States Patent

Younkin

[15] 3,648,230
[45] Mar. 7, 1972

[54] AIRCRAFT HEADING AND COURSE DISPLAY

[72] Inventor: James R. Younkin, Mineral Wells, Tex.

[73] Assignee: Mitchell Industries, Inc., Mineral Wells, Tex.

[22] Filed: Sept. 8, 1969

[21] Appl. No.: 855,860

[52] U.S. Cl. .................340/27 NA, 343/106 R, 343/107
[51] Int. Cl. .................................B64d 43/00, G01s 1/16
[58] Field of Search ...............340/27 NA; 343/106 R, 107, 343/108 R

[56] References Cited

UNITED STATES PATENTS

| 2,532,974 | 12/1950 | Warner | 340/27 NA UX |
|---|---|---|---|
| 2,732,550 | 1/1956 | Reedy | 343/107 |
| 2,778,004 | 1/1957 | Lear et al. | 340/27 NA |
| 2,999,237 | 9/1961 | Cypser et al. | 343/107 |
| 3,128,464 | 4/1964 | Kaufman et al. | 343/107 |
| 3,131,386 | 4/1964 | Spencer et al. | 343/107 X |

Primary Examiner—T. H. Tubbesing
Attorney—Richards, Harris and Hubbard

[57] ABSTRACT

A heading card with an azimuth scale on the face thereof is mounted on a cage rotatable about the axis of the card. The cage is responsive to the output of a directional gyro for controlling the orientation of the heading card. An omnilocalizer-bearing selector and a bearing deviation indicator are mounted within the cage for the selection of a navigation bearing. A glide slope indicator is responsive to reception of a selected localizer frequency for moving into view over the face of the heading card. A number of malfunction and weak signal indicators are also selectively movable into view over the face of the heading card when required.

13 Claims, 13 Drawing Figures

INVENTOR:
JAMES R. YOUNKIN

INVENTOR:
JAMES R. YOUNKIN

Richards, Harris & Hubbard
ATTORNEY

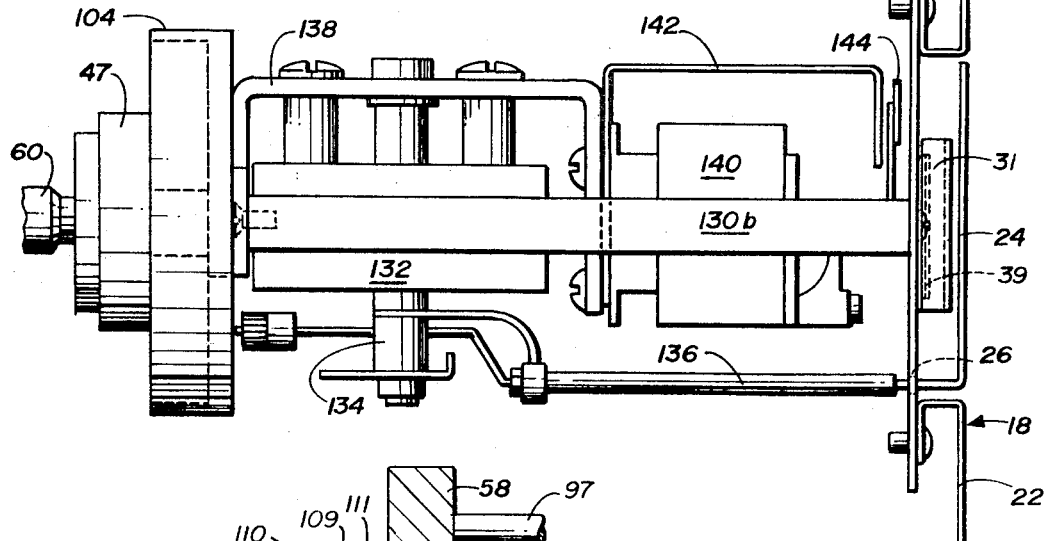
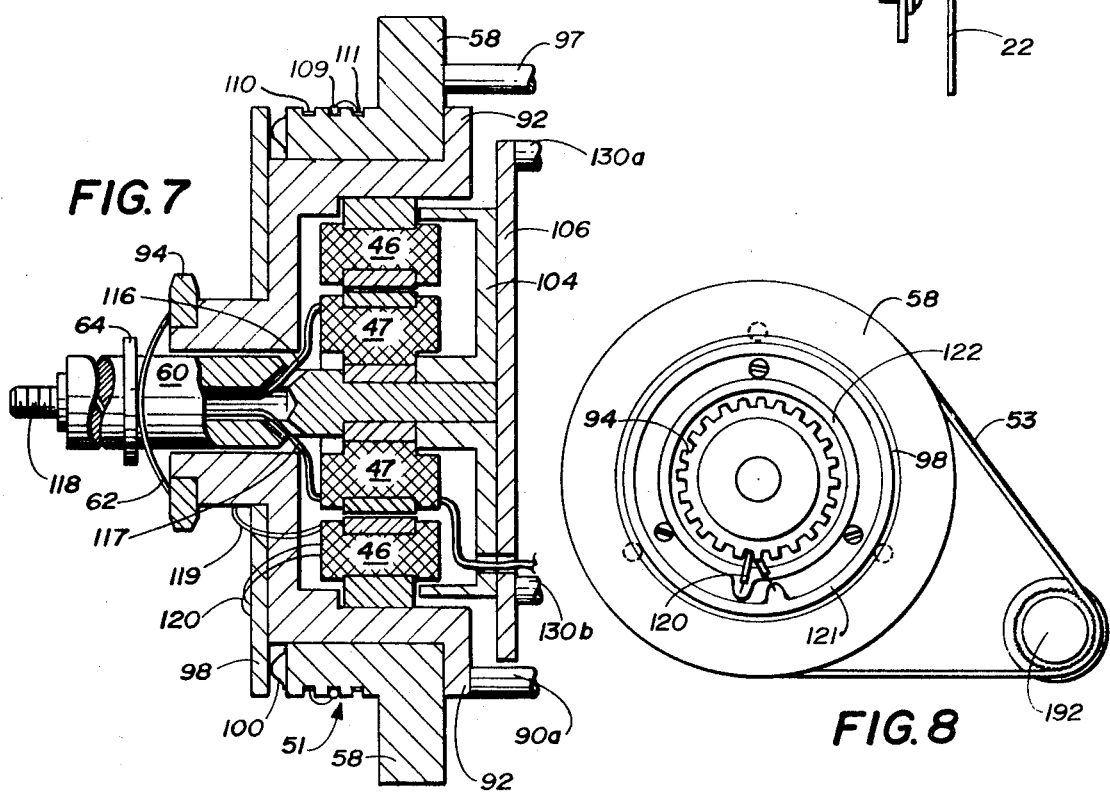
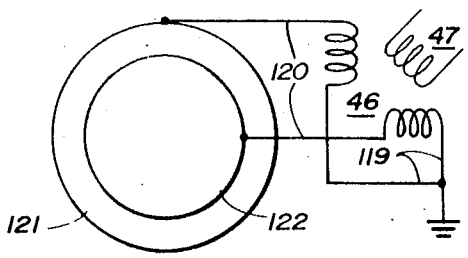

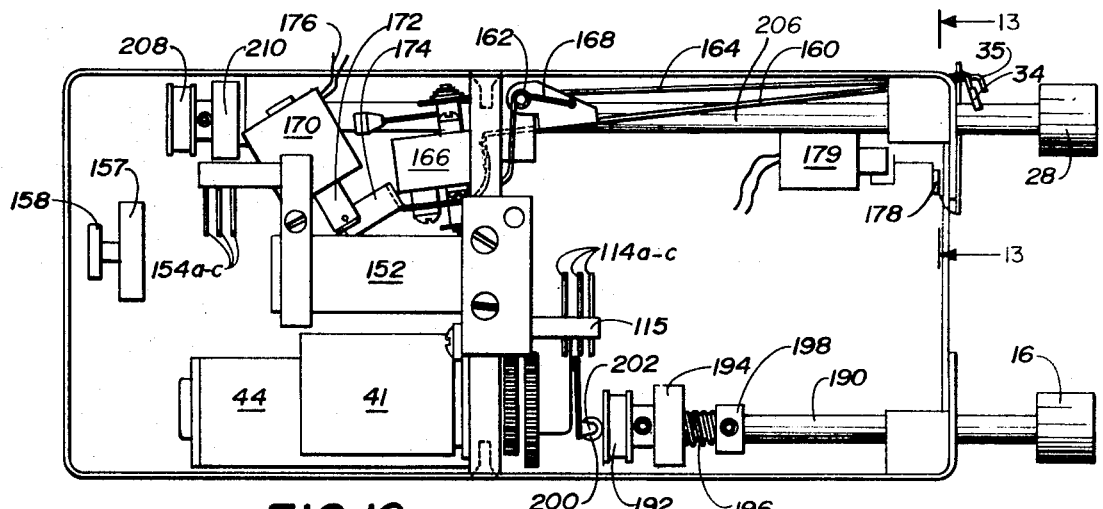
FIG. 10
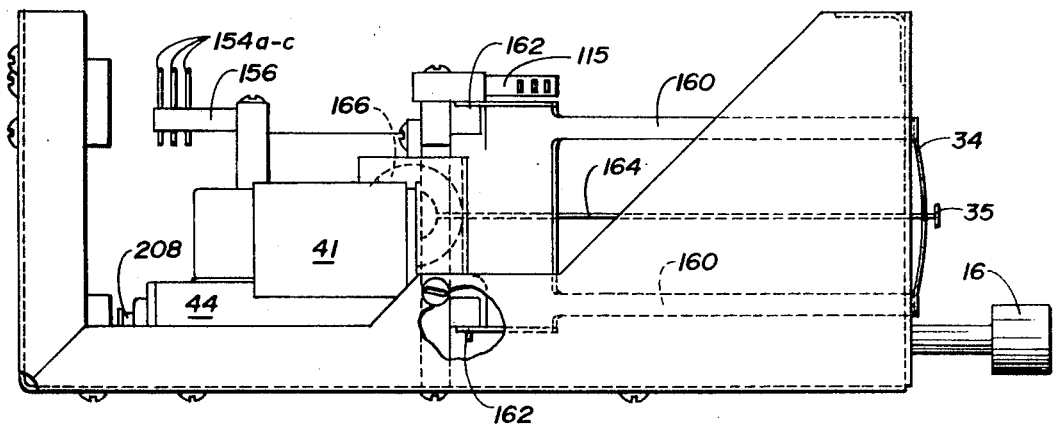
FIG. 11
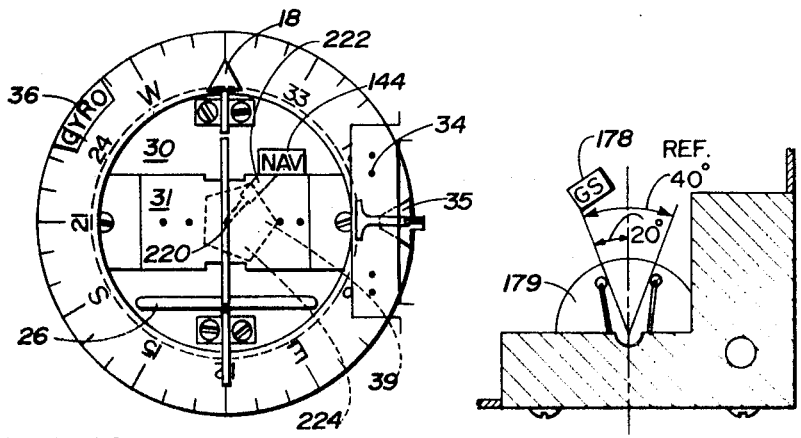
FIG. 12
FIG. 13
INVENTOR:
JAMES R. YOUNKIN
Richards, Harris & Hubbard
ATTORNEY 3,648,230

AIRCRAFT HEADING AND COURSE DISPLAY

FIELD OF THE INVENTION

This invention relates to aircraft instrument displays, and more particularly to an improved heading and course display for an aircraft.

THE PRIOR ART

Aircraft instrument displays have heretofore been developed wherein heading cards carrying azimuth scales are rotated by a directional gyro, and wherein heading selection indexes are movable about the azimuth scales. Additionally, instrument displays have been heretofore known wherein an omni bearing pointer is moved in accordance with deviation of the aircraft from a selected omni bearing. In such previously developed displays, differential gear trains have often been utilized to provide steering commands in response to the relative positions of the shafts rotating the heading card, the heading selection indexes and the omni bearing pointer. Additionally, in previously developed instrument displays, indications of the heading of the aircraft are often provided with the use of expensive wound components such as transformers or the like. An example is U.S. Pat. No. 2,999,237 issued to Cypser et al. on Sept. 5, 1961. These differential gear trains and wound components are not only relatively expensive, but such components are often unduly bulky thereby resulting in displays of rather large area. Such prior displays have also been subject to maintenance problems due to the complex mechanisms involved. Moreover, in many prior aircraft course displays, such information as a glide slope indication is permanently presented to the pilot, even through such information is not required during the majority of flying time.

SUMMARY OF THE INVENTION

In accordance with the present invention, a first cage is connected to the rear of a heading card having an azimuth scale on the face thereof, the first cage rotatable about the axis of the heading card in response to the output of a directional gyro. A second cage is disposed for generally concentrical rotation inside the first cage in dependence upon selected omni or localizer course instructions. Course display indicator members are connected to the second cage for movement adjacent the heading card. The first and second cages are concentrically supported from a single cantilevered bearing.

In accordance with another aspect of the invention, a gyro oriented heading card has a azimuth scale indicated about the margin thereof. A cage supports the card for rotation about the axis of the card and is operated by a motor responsive to the output of the directional gyro for controlling the orientation of the card. A navigation bearing selector is mounted within the cage for selection of a navigation bearing. A bearing deviation indicator is also mounted within the cage and is coupled for movement with the bearing selector under the control of the motor. margin indicating In accordance with another aspect of the invention, a meter movement is continuously connected to be energized by the output of a glide slope receiver. The meter movement is mounted rearwardly of a card rotatable in response to the heading of the aircraft. An indicating needle extends from the meter m movement to a position in front of the card. A meter scale is pivoted rearwardly of the card for movement with the indicating needle between a position over the face of the card and a position outside the margin of the card. Circuitry is responsive to tuning a localizer receiver to a localizer frequency for moving the meter scale along with the indicating needle to the position over the face of the card.

In accordance with other aspects of the invention, an aircraft heading and course selection display is provided wherein a warning indicator is movable over the face thereof in response to failure of the directional gyro. Additional indications are provided to indicate to or from travel along an omni course, and to indicate use of the display either on an omni or a localizer course.

DESCRIPTION OF THE DRAWINGS

For a more complete understanding of the present invention and for further objects and advantages thereof, reference is now made to the following description taken in conjunction with the accompanying drawings, in which:

FIG. 6 is a side view of a portion of the display shown in FIG. 3;

FIG. 7 is a sectional view of the potentiometer and stator-rotor assembly;

FIG. 8 is a view of the belt drive for one of the potentiometers of the display shown in FIG. 3;

FIG. 9 is a schematic illustration of the rotor-stator mechanism of the display;

FIG. 10 is a top view of the display shown in FIG. 3 with portions of the assembly removed therefrom;

FIG. 11 is a side view of the unit shown in FIG. 10;

FIG. 12 is a front view of the present display with the glide slope indicator and warning flags actuated; and FIG. 13 is a somewhat diagrammatic sectional view taken along section lines 13—13 in FIG. 10.

DESCRIPTION OF THE PREFERRED EMBODIMENT

Figure 1:
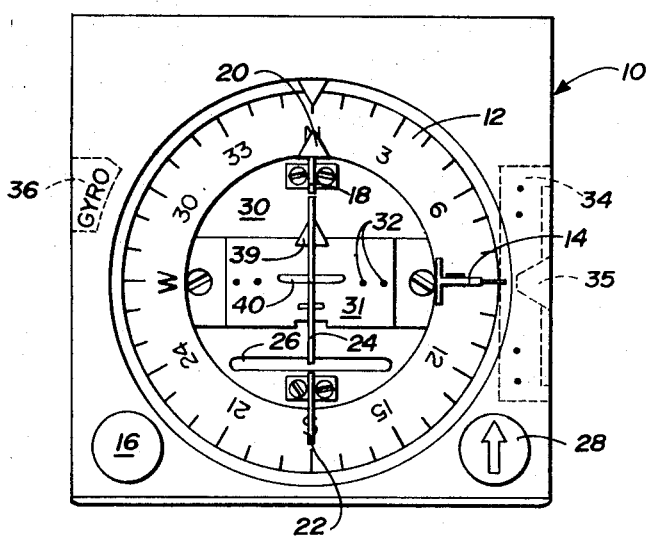
FIG. 1 is a front view of the present display instrument.

FIG. 1 illustrates the present display which is mounted in a rectangular frame indicated generally by the numeral 10 which is adapted to be fixedly attached to an aircraft instrument display panel. The present display is mounted in a circular cutout within the frame 10, with a glass cover being disposed over the cutout. The display includes a gyrooriented annular heading card 12 which has an azimuth scale indicated about the margin thereof. The heading card 12 is responsive to the output of a directional gyro, as will be later described in detail, for rotation to illustrate the present heading of the aircraft. A heading 14 is movable around the outer periphery of the heading card 12 in order to allow the pilot to select a desired heading. Movement of the heading indicator 14 is accomplished by manual rotation of a knob 16 located on the front of the display.

Heading card 12 has the center portion cut away for view of a course or bearing arrow 18. Arrow 18 includes a head portion 20 and a tail portion 22, with an intermediate portion 24 being utilized as a bearing deviation indicator. The intermediate portion 24 is moved through a linkage passing through a slot 26 in the face of the display in a manner to be subsequently described in greater detail. The position of the arrow 18 is controlled by manual rotation of a knob 28 to enable selection of a desired omni or localizer bearing.

After selection of the desired bearing, the intermediate portion 24 is moved to the left or right to indicate deviation of the aircraft from the selected bearing. The head and tail portions of the arrow 18 are mounted on a disk 30 which includes a scale 31 with course deviation markings 32 disposed thereof. A glide slope indicator scale 34 and a meter needle 35 are hidden from view until a glide slope indication is required, whereupon the assembly will be pivoted into view in a manner to be later described. A gyro warning indicator 36 is also normally hidden behind the frame 10, but is pivoted into view when a malfunction of the gyro occurs in a manner to be subsequently described. An omni bearing to-from indicator 39 appears from behind the scale 31. A representation of the aircraft 40 is fixedly placed on the glass cover of the display to provide a fixed reference for the movable indicia of the display.

Figure 2:
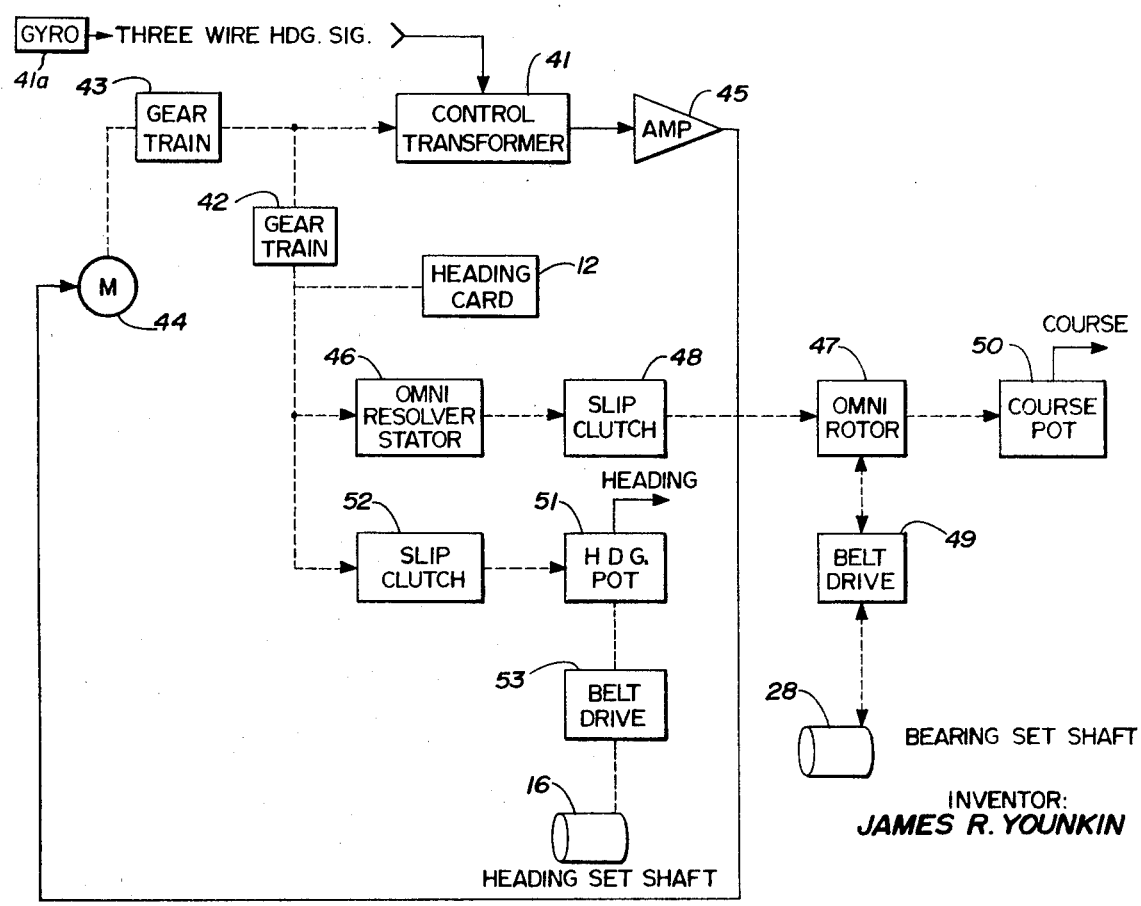
FIG. 2 is a block diagram of the basic portions of the present display.

FIG. 2 illustrates a block diagram wherein a heading signal derived from a directional gyro 41a in the form of a three wire stator synchro signal is fed to the stator of a control transformer 41. The heading signal is derived from any suitable source of heading information, such as the Mitchell Remote-Directional Gyro manufactured and sold by the Mitchell Company of Mineral Wells, Texas. The control transformer 41 is mounted directly to the case of the present instrument, with the rotor of the control transformer 41 directly coupled through one gear train 42 to the heading card 12. The rotor of the transformer 41 is also coupled through a gear train 43 to a servo motor 44. The signal output of the control transformer 41 as derived from the rotor terminals is applied to a servo amplifier 45. The servo amplifier 45 in turn translates the AC heading error signal into a DC voltage which is then applied to the servo motor 44. The frame of the motor 44 is rigidly mounted to the frame of the instrument. The output of the motor 44 is coupled through the gear train 43 back to the rotor of the control transformer 41.

Additionally, rotation as applied to the rotor of the control transformer 41 is applied through one gear path of 1:1 ratio to the heading card 12. The heading card 12 is directly connected to the stator of an omniresolver 46 which is utilized in selecting the omnibearing to be flown. Note that direct coupling is employed here as opposed to gearing. The omnirotor 47 is connected to the omniresolver stator 46 through a slip clutch 48 so that when the heading card 12 rotates the complete omniresolver rotates in unison with the heading card 12. However, the rotor 47 can be rotated relative to the stator 46 for the purpose of selecting omnibearing by rotating the knob 28. This knob is connected to a shaft which is coupled through a belt drive 49 directly to the rotor 47. The rotor 47 is then rotated relative to the stator 46 because of the presence of the slip clutch 48. However, the rotation of the heading card 12 will cause the rotor 47 and stator 46 to rotate together as the slip clutch 48 does not then slip. On the otherhand, when it is desired to set omnibearing by manual control of the knob 28, the slip clutch 48 slips and thus allows setting of the omnibearing Additionally, a course potentiometer 50 mounted in the rear of the instrument is directly coupled to the omnibearing resolver rotor 47. The course potentiometer 50 is provided to generate a signal which represents the direction of the course being flown in a radio navigation problem.

Referring back to the heading card 12, it will also be noted that the position of the heading card 12 is coupled to a heading potentiometer 51 through a slip clutch 52. Operation of the slip clutch 52 is identical to that of the omnibearing selector slip clutch 48, in that the heading set knob 16 is coupled through a belt drive 53 to the heading potentiometer 51. Operation of knob 16 is the means of setting the direction of flight, as indicated by the heading bug marker that rotates relative to the heading card 12. The slip clutch 52 will slip to allow setting of the heading bug marker.

Figure 3:
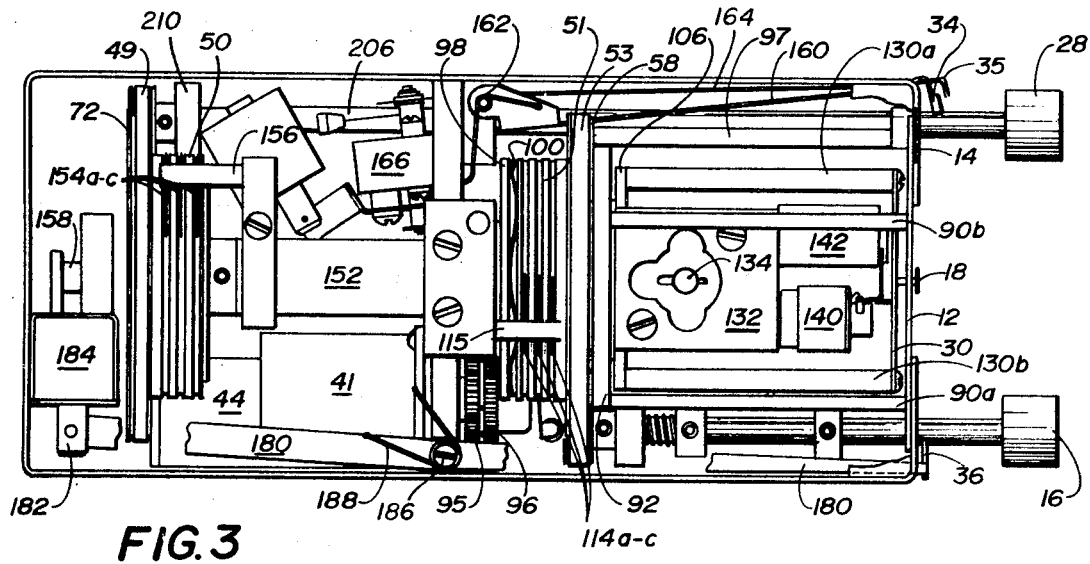
FIG. 3 is a top view of the fully assembled display instrument.
Figure 4:
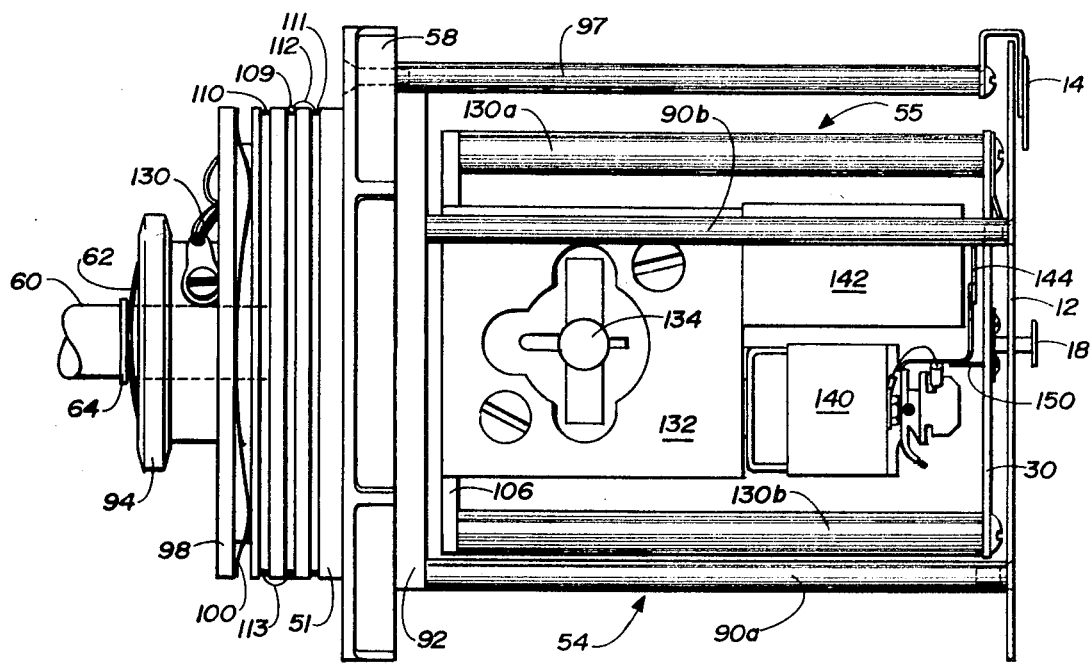
FIG. 4 is a top view of a portion of the cage drive assembly of the display shown in FIG. 3.
Figure 5:
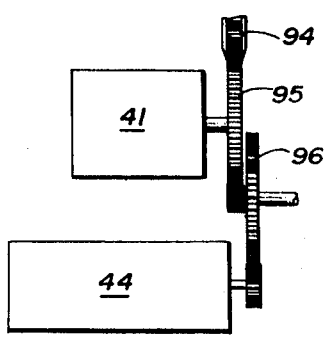
FIG. 5 is a side view illustrating the gear train output of the present servo motor.

Referring to FIG. 3, wherein like numbers are used for like and corresponding parts shown in the preceding FIGURES, the top of the present display is shown with the frame 10 removed. It will be noted that the course potentiometer 50 is disposed at the rear of the instrument case, with the heading potentiometer 51 disposed in the center portion of the instrument case. The control transformer 41 is disposed over the motor 44 and rearwardly of the potentiometer 51. The heading card 12 is connected to a cage 54 which comprises three spaced-apart arms 90a–c, arm 90c not illustrated in this view. Arms 90a–c are connected to a circular stator housing 92 which is connected to a gear 94 (FIG. 4). As will be later shown, housing 92 carries the resolver stator 46. As best shown in FIG. 5, the gear 94 is rotated by a gear 95 connected to the output shaft of the control transformer 41. The gear 95 is also geared with a gear train 96 meshed with the output of the servomotor 44. A potentiometer pulley 58 includes an arm 97 which is rigidly connected with the heading bug 14. The belt drive 53 causes rotation of the pulley 58 when the knob 16 is rotated in the manner previously described in order to move arm 97 and heading bug 14 around the periphery of the heading card 12.

FIG. 4 illustrates the heading potentiometer 51 of the invention in greater detail. A slip ring 98 is disposed adjacent and rearwardly of potentiometer pulley 58, and a wave washer spring 100 is biased between slip ring 98 and potentiometer pulley 58. A rotor block 104 (see FIG. 7) rotates within the potentiometer 51 in response to rotation of a shaft 60. Shaft 60 supports the cage 54 in a cantilevered manner to be later described. As also will be later shown, block 104 carries the rotor 47. A cage support 106 is rigidly connected to block 104.

The potentiometer 51 is integrally connected rearwardly of the potentiometer pulley 58. A potentiometer resistance wire 109 (shown in cross section for clarity of illustration) is disposed around an outer periphery of the potentiometer 51. Slip rings 110 and 111 (also shown in cross section) are also disposed about the potentiometer 51 on either side of the wire 109, and jumper leads 112 and 113 are connected between the wire 109 and each of the slip rings 110 and 111. As shown in FIG. 3, three brushes 114a–c are supported by a brush post 115 for wiping over the slip rings 110 and 111 and the wire 109. A positive voltage is applied to ring 110 and a negative voltage to ring 111. Brush 114b picks off a voltage from wire 109 which is representative of the angular position of the potentiometer 51. This voltage is the heading signal.

As shown in FIG. 4, a wave washer 62 is connected about the shaft 60 and is held in place by a retaining ring 64. Ring 64 fits within a groove in shaft 60. The wave washer 62 acts as a slip clutch between the shaft 60 and the gear 94.

FIG. 7 illustrates the potentiometer 51 and the resolver stator 46 and rotor 47 configuration in section. Shaft 60 carries the rotor 47 on the end thereof. Rotor 47 comprises a wound annular coil with insulation on the inner and outer peripheries of the coil. Wires 116 and 117 extend from the rotor 47 through the hollow center of shaft 60. Wires 116 and 117 are connected to slip rings 118 at the rearward end of shaft 60. As will be later shown, brushes wipe the rings 118 to polarize the rotor 47 with electrical signals and to connect the rotor 47 with the servo amplifier 45. The rotor block 104 is rigidly connected to the shaft 60 and rotor 47. The cage support 106 is rigidly connected to block 104.

The stator 46 is concentrically disposed about the rotor 47. Stator 46 also comprises an annular wound coil and includes insulation on both inner and outer peripheries thereof. Stator 46 is rigidly connected, as by adhesive, to the stator housing 92. Gear 94 is rigidly connected to the stator housing 92. Wires 119 and 120 extend from the stator 46, with wires 119 being grounded to the stator housing 92 and wires 120 connected to conductive rings on the slip ring 98. The spring 100 tends to rotate the ring 98 with rotation of the potentiometer 51, but the spring bias is not sufficient to overcome the torque exerted by motor 44 and slippage will thus occur between potentiometer 51 and stator housing 92.

Referring to FIg. 8, the slip ring 98 has a printed circuit board formed on the face thereof and includes a first conductive ring 121 and an inner concentric conductive ring 122. The rings 121 and 122 are connected to the wires 120, each ring thus being common to a different terminal of the stator 46, as schematically illustrated in FIG. 9. Brushes, not shown, contact the conductive rings 121 and 122 and are connected to wires which run to the directional gyro in the conventional synchro manner.

Referring again to FIGS. 3 and 4, the concentric dual cage configuration of the invention is shown. A second cage 55 is mounted for rotation within the outer cage 54 and comprises the support 106 which includes two arms 130a–b. Arms 130a–b are rigidly connected at their forward end to the disk 30, the cage 55 supporting the mechanism which controls the operation of the bearing arrow 18 and the intermediate portion, or bearing deviation indicator 24. A right-left meter 132 is carried by the support 106 for rotation therewith and includes a meter movement 134 which extends to the front of the display to control the movement of the intermediate portion 24.

The meter movement 134 is best illustrated in FIG. 6, wherein a movable arm 136 extends forwardly of the display and connects to the base of the intermediate portion 24. The meter movement 134 is connected to wires, not shown, which receive electrical signals from a converter indicative of the deviation of the aircraft from its selected bearing.

The meter 132 is rigidly connected to the support 106 by means of a generally U-shaped member 138. A to-from meter 140 is attached to the U-shaped member 138 and includes a mask 142. A Nav flag 144 is pivotal by the meter 140 with respect to the fixed mask 142. The disk 30 is attached between the two arms 130a–b to provide a background for the bearing arrow 18 ad scale 31. The to-from meter 140 controls the movement of the to-from indicator 39 which may be selectively moved from behind the scale 31 in a manner to be subsequently described. FIG. 4 shows the connection 150 which extends from meter 140 to connect with the to-from indicator member 39 and the Nav flag 144.

Referring again to FIG. 3, a single bearing 152 rotatably supports the shaft 60 in a cantilevered manner. Bearing 152 thus also supports both of the concentric cages 54 and 55 in a cantilevered relationship. The course potentiometer 50 is connected for rotation with the pulley 72. The belt drive 49 is adapted to be moved by rotation of the knob 28 in order to rotate potentiometer 50. Brushes 15a–c are connected to a brush support 156 to wipe over contacts on the potentiometer 50 in order to provide course signals. The rings 118 on the end of shaft 60 are wiped by brushes contained in a brush assembly 158.

Potentiometer 50 is constructed in a similar manner as the potentiometer 51, and includes a pair of slip rings each supplied with a voltage of different potential by brushes 154a and 154c. A potentiometer wire is disposed between the slip rings and is connected to the slip rings by jumper wires 180° apart. Brush 154b picks off a voltage from the potentiometer wire which is representative of the angular position of potentiometer 50 and which serves as course signals.

Again referring to FIG. 3, the glide slope scale 34 is mounted on an elongated arm 160 which is rearwardly mounted at a pivot 162. The needle 35 is mounted on a meter arm 164 which is connected to a meter movement 166. The construction and operation of the glide slope indicator is best illustrated in FIGS. 10 and 11, wherein portions of the display have been removed for clarity of illustration. A spring 168 normally biases the scale 34 and needle 35 in the outward position illustrated in FIG. 10. A solenoid 170 includes a solenoid plunger 172 which is rigidly connected with a bracket 174 to the meter movement 166.

The solenoid 170 is operable by electrical signals fed via wires 176 from a localizer receiver which is tuned to a specified localizer frequency. When the solenoid 170 is actuated, the plunger 172 is withdrawn to move the arms 160 and 164 about the pivot 162 in order to bring the scale 34 and the needle 35 in front of the face of the display. This position of scale 34 and the needle 35 is shown in FIG. 12. The meter movement 166 is controlled by the glide slope signal in order to provide visual indication to the pilot of deviation from the desired glide slope path on the scale 34. FIG. 11 illustrates a side view of the glide slope scale 34 and the needle 35, where it may be seen that the scale 34 is carried by a pair of like arms 160 both of which are pivoted about the axis 162. An important aspect of this invention is that the glide slope information is not supplied to the pilot unless he requires it, thus eliminating instrument clutter.

Referring to FIGS. 10 and 13, a glide slope flag 178 is illustrated. Flag 178 is movable in a 40° arc by means of a glide slope warning meter 179. In the position illustrated in FIG. 13, the glide slope flag 178 is pivoted to be visible to the pilot. When the meter 179 rotates the flag 178 to the other extreme position, the glide slope warning flag 178 is hidden from the pilot's view. Meter 179 is responsive to the glide slope signal to keep the glide warning flag 178 pivoted in view of the pilot until the received glide slope signal is of sufficient strength to insure accuracy of the glide slope needle 35. When a signal of sufficient strength is received, the flag 178 is pivoted by the meter 179 out of sight from the display.

The gyro warning indicator, or flag 36, shown in FIG. 3, is connected to an extension arm 180 which extends rearwardly to a connection with a solenoid plunger 182. Plunger 182 is controlled by the solenoid 184. Extension arm 180 is pivoted about a pivot point 186 and a spring 188 provides a bias on the arm 180 for a counterclockwise movement about the pivot 186.

In normal operation of the present display, the solenoid 184 is energized and the plunger 182 is in the position shown in the FIG. 3, the gyro warning indicator 36 being thus pivoted out of sight as illustrated in FIG. 1. When the power to the directional gyro of the system fails, solenoid 184 allows the plunger 182 to move outwardly. The bias of the spring 188 then causes the gyro warning indicator 36 to be moved in front of the display to provide a visual warning of the gyro failure. The warning position of the gyro warning indicator 36 is illustrated in FIG. 12.

The construction of the mechanism which enables the knobs 16 and 28 to rotate the potentiometer pulleys 58 and 72 is best illustrated in FIG. 10. The knob 16 is connected to a rotatable shaft 190 which includes at the end thereof a small pulley member 192. Shaft 190 is slidably supported by a fixed support 194, and a spring 196 is disposed between the support 194 and an enlarged portion 198 on shaft 190. The end of the pulley member 192 bears against a rotatable wheel 200 mounted on a switch arm 202. The switch arm 202 operates a switch connected in the energizing circuit to the solenoid 170.

In operation of the heading selection mechanism, the knob 16 is manually depressed by the pilot. This causes switch arm 202 to be pivoted to open the switch and deenergize the solenoid 170. The glide slope scale 134 and needle 35 are thus moved out of sight from the display, and will not obstruct the heading bug 14 as it is moved around the heading card 12. The pilot then rotates the knob 16 to rotate the pulley member 192, the belt 53, and the pulley 58 and the potentiometer 51. The belt 53 is preferably constructed of rubber and includes ridges thereon in order to provide accurate setting of the pulley 58. When the knob 16 is released from depression, the switch arm 202 closes the switch and the solenoid 170 is again actuated to pivot the glide slope scale 34 and needle 35 back into position over the display face.

The heading knob 28 is connected to a rotatable shaft 206 which extends rearwardly and terminates in a small pulley 208. Shaft 206 is journaled for rotation in a support 210. Rotation of the knob 28 causes rotation of the pulley 208 in order to rotate the pulley 72 by means of the belt 49 (FIG. 3).

FIG. 12 illustrates the operation of the to-from indicator 39 and the Nav flag 144. The Nav flag 144 is connected to the to-from meter 140 and is pivoted into view as shown in FIG. 12 when the localizer or omni frequency is unusable. The Nav flag 144 is pivoted into view through a window in the disk 30, with the mask 142 being disposed behind the Nav flag 144 to provide a background when the Nav flag 144 is pivoted out of sight. The to-from indicator 39 has a five-sided configuration and is adapted to be pivoted about a pivot point 220. The indicator 39 is controlled by the meter 140, which in turn is controlled by a suitable converter.

When the indicator 39 is pivoted in the counterclockwise position, the tip 222 of the indicator 39 is visible as the arrow point, as shown in FIG. 1. This indicates that the aircraft is flying to the omni signal source. When the indicator 39 is pivoted clockwise into position, the tip 224 is visible to indicate to the pilot that the aircraft is flying from the omni signal source. The indicator 39 is not pivoted into sight when an omni signal is not received. The to-from indicator 39 is rotated in the counterclockwise position to indicate when the display is operating on a localizer frequency.

In operation of the present display, to select a heading for the aircraft, the pilot depresses the knob 16 and rotates the knob 16 to set the heading bug 14 at the desired azimuth. The relative angular position of the heading bug 14 is sensed by the brush 114b wiping over the potentiometer 51. The brush 114b thus generates a heading signal which is fed to the control system of the aircraft. The aircraft is turned in response to this heading signal and the direction change of the aircraft is sensed by the directional gyro. The signals from the directional gyro are fed to the control transformer 41, which generates control signals to the servomotor 44 through the servo amplifier 45. This rotates the stator 46, the stator housing 92, the arms 90a-c and the heading card 12 as the aircraft turns. When the heading card 12 and heading bug 14 are aligned, this condition is sensed and the servomotor 44 is stopped.

To set the aircraft on a desired omni or localizer bearing, the pilot rotates the knob 28 to rotate the pulley 72. This causes rotation of the shaft 60, rotor 47, rotor block 104, cage support 106, arms 130a-b, disk 30 and the bearing arrow 18 to the desired azimuth. The position of the pulley 72 is sensed by the brush 154b from the potentiometer 50 to provide a course signal to the aircraft. Upon reception of bearing signals, the bearing deviation indicator 24 moves to visually show the pilot the right or left bearing deviation. The to-from indicator 39 illustrates whether or not the aircraft is flying to or from the omni source. The Nav flag visually illustrates when the omni signal is unusable.

When the radio receiver is tuned to a glide slope frequency, the glide slope scale 34 and needle 35 pivot into view as shown in FIG. 12. The needle 35 is moved vertically along scale 34 in response to meter movement 166 to illustrate deviation from the glide slope path. When the glide slope signal is too weak to be usable, the glide slope warning flag 178 is pivoted into view.

It will be seen that the present invention provides a plurality of useful navigation functions in a novel manner. Data is provided to the pilot only when the data is needed to thereby prevent instrument clutter. The present display eliminates delicate differential gearing and provides an accurate, economical and efficient display.

While the present invention has been described with respect to specific details thereof, it is to be understood that various changes and modifications will be suggested to one skilled in the art, and it is intended to encompass those changes and modifications which fall within the true scope of the appended claims.

What is claimed is:

1. An aircraft heading and course display comprising:
 a heading card having a central cutout portion and an azimuth scale on the face thereof,
 first cage means connected to the rear of said heading card and rotatable about the axis of said heading card in response to the output of a directional system,
 second cage means disposed for generally concentric rotation within said first cage means in dependence upon selected course instructions,
 course display members connected to said second cage means and disposed for movement within said central cutout portion of said heading card,
 support members extending from said display member rearwardly to a rotor block,
 shaft means connected to said rotor block,
 means for rotating said shaft means from the front of said display,
 first potentiometer means connected to said shaft means for generating electrical signals representative of the relative angular position of said shaft means, and
 bearing means mounted rearwardly of said first and second cage means for cantilevered support thereof.

2. The display of claim 1 wherein said first cage means comprises:
 second potentiometer means connected thereto for generating electrical signals representative of the angular position thereof,
 said shaft means extending through said second potentiometer means for connection to said first potentiometer means rearwardly of said second potentiometer means.

3. An aircraft heading and course display comprising:
 a heading card having an azimuth scale on the face thereof,
 first cage means connected to the rear of said heading card and rotatable about the axis of said heading card in response to the output of a directional gyro,
 second cage means disposed for generally concentric rotation within said first cage means in dependence upon selected course instructions,
 a stator connected to said first cage means and rotatable by a motor in response to the directional gyro,
 a rotor disposed concentric to said stator and connected to rotate said second cage means,
 a potentiometer block disposed about said rotor and stator and carrying a potentiometer member about the outer periphery thereof,
 slip rings mounted on said potentiometer block for supplying voltage to said potentiometer member,
 brush means wiping said potentiometer member for supplying an electrical indication of the angular position of said potentiometer block,
 course display members connected to said second cage means and disposed for movement adjacent said heading card, and
 bearing means mounted rearwardly of said first and second cage means for cantilevered support thereof.

4. The display of claim 3 and further comprising:
 a meter scale and meter movement pivotable to move from a position outside the margin of said card to a position over the face of said card, and
 means responsive to reception of a selected localizer frequency for moving said meter scale and meter movement over the face of said card.

5. The combination of claim 3 and further comprising:
 means carried by said second cage means for moving an index member between two positions in response to the direction of travel along an omni radial.

6. The combination of claim 3 and further comprising:
 means responsive to a gyro failure for moving a gyro warning indicator member from outside the margin of said card to a position over the face of said card.

7. The combination of claim 3 and further comprising:
 means responsive to the reception of an omni signal for moving a navigation mode indicator from a nonvisible position to a visible position over the face of said card.

8. In an aircraft instrument display having a heading selector mechanism including a card which is rotatable in response to the aircraft heading, the combination comprising:
 a meter movement connected to be energized by glide slope signals, said meter movement mounted rearwardly of said card and having an indicating needle extending to a position in front of said card,
 a meter scale pivoted rearwardly of said card and coupling with said meter movement for movement along with said indicating needle between a position over the face of said card and a position outside the edge of said card,
 means responsive to tuning a localizer receiver to a localizer frequency for moving said meter scale and said indicating needle to the position over the face of said card,
 a heading indicator movable around the margin of said card by depression and rotation of a shaft extending from the front of said instrument display, and
 means responsive to the depression of said shaft for moving said meter scale and said indicating needle to the position outside the edge of said card.

9. In an aircraft instrument display having a heading selector mechanism including a card which is rotatable in response to the aircraft heading, the combination comprising:
 a meter movement connected to be energized by glide slope signals, said meter movement pivotally mounted rearwardly of said card and having an indicating needle extending to a position in front of said card, a meter scale pivoted rearwardly of said card and coupling with said meter movement for movement along with said indicating needle between a position over the face of said card and a position outside the edge of said card, and solenoid means responsive to tuning a localizer receiver to a localizer frequency for moving said meter scale and said indicating needle to the position over the face of said card.

10. An aircraft heading and course system comprising:

a heading card having an azimuth scale on the face thereof, first cage means connected rearwardly of said heading card and rotatable in response to a directional output signal, second cage means concentrically rotatable within said first cage means in response upon selected course instructions, a bearing located rearwardly of said cage means for rotatable support thereof, a first potentiometer coupled with said first cage means for generating heading signals, and a second potentiometer coupled with said second cage for generating course signals for use when flying with radio signals.

11. The display system of claim 10 and further comprising:

manually operable means for setting said first cage means and said first potentiometer to a desired heading.

12. The display system of claim 10 and further comprising:

manually operable means for setting said second cage means and said second potentiometer to a desired course position.

13. An aircraft display comprising:

an instrument housing including an azimuth card having a central cutout portion and rotatable in response to the aircraft heading, a course display member disposed within said central cutout portion, a mask strip extending across the central portion of said course display member, a unitary indicator member disposed behind said mask and rotatable about an axis perpendicular to said mask, said indicator member having a first pointed top portion adapted to be rotated in a first direction to appear above said mask to indicate that the aircraft is flying to a radio beam, said indicator member having a second pointed tip portion adapted to be rotated in a second direction to extend below said mask to indicate that the aircraft is flying from the radio beam, and a single meter movement for controlling the rotation of said indicator member in said first and second directions.

* * * * *

PO-1050
(5/69)

UNITED STATES PATENT OFFICE
CERTIFICATE OF CORRECTION

Patent No. 3,648,230                    Dated  Mar. 7, 1972

Inventor(s)  James R. Younkin

It is certified that error appears in the above-identified patent and that said Letters Patent are hereby corrected as shown below:

```
Col 1, line 56, cancel "margin indicating";
       line 62, "meter m movement" should be --meter movement--.
Col 2, line 44, after "heading" insert --indicator commonly termed
                a heading bug,--.
Col 5, line 13, "ad" should be --and--;
       line 26, "15a-c" should be --154a-c--;
       line 74, after "glide" insert --slope--.
Col 6, line 35, "134" should be --34--.
Col 10, line 15, "top" should be --tip--.
```

Signed and sealed this 15th day of August 1972.

(SEAL)
Attest:

EDWARD M. FLETCHER, JR.                 ROBERT GOTTSCHALK
Attesting Officer                       Commissioner of Patents